(12) United States Patent
Yang et al.

(10) Patent No.: US 8,008,807 B2
(45) Date of Patent: Aug. 30, 2011

(54) UNINTERRUPTIBLE POWER SUPPLY WITH LOW POWER LOSS

(75) Inventors: Ping-Long Yang, Taoyuan Hsien (TW); Chia-Hsiang Li, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 203 days.

(21) Appl. No.: 12/546,910

(22) Filed: Aug. 25, 2009

(65) Prior Publication Data
US 2010/0148584 A1     Jun. 17, 2010

(30) Foreign Application Priority Data
Dec. 11, 2008   (TW) .............................. 97148141 A (51) Int. Cl.
*H02J 7/00* (2006.01)
*H02J 9/00* (2006.01)
(52) U.S. Cl. .......................................... 307/66; 307/64
(58) Field of Classification Search .................... 307/43, 307/64, 66, 80, 85
See application file for complete search history.

(56) References Cited

U.S. PATENT DOCUMENTS
2008/0231118 A1* 9/2008 Roepke .......................... 307/64
* cited by examiner

*Primary Examiner* — Jared J Fureman
*Assistant Examiner* — Carlos Amaya
(74) *Attorney, Agent, or Firm* — Kirton & McConkie; Evan R. Witt (57) ABSTRACT

An uninterruptible power supply includes an energy storage unit, an AC-to-DC converting circuit, a charging circuit, a selection circuit, a primary detecting circuit, a primary control circuit and a secondary control circuit. The primary detecting circuit is connected to an output loop of the uninterruptible power supply for detecting an operating status of the uninterruptible power supply and issuing a corresponding operating message. The primary control circuit is connected to the primary detecting circuit and the selection circuit for controlling operations of the uninterruptible power supply. The secondary control circuit is connected to the primary detecting circuit, the selection circuit and the primary control circuit for controlling operations of the uninterruptible power supply. The primary control circuit and the secondary control circuit are enabled or disabled according to the operating message.

20 Claims, 9 Drawing Sheets

UNINTERRUPTIBLE POWER SUPPLY WITH LOW POWER LOSS

FIELD OF THE INVENTION

The present invention relates to a power supply, and more particularly to an uninterruptible power supply (UPS) with low power loss.

BACKGROUND OF THE INVENTION

With increasing development of information industries and high-tech industries, most precise electronic instruments and facilities need highly reliable power to maintain normal operations. Generally, an uninterruptible power supply (UPS) are widely used to provide stable power to the loads that are connected with. In other words, UPS apparatuses become essential for supplying stable power.

Generally, some important electrical appliances are powered by the uninterruptible power supply if the input AC voltage from the utility power source is suffered from a sudden variation or interruption. In addition, the uninterruptible power supply will support the electrical appliances to implement some advanced functions. The execution of the advanced functions may facilitate the user to realize the operating statuses of the uninterruptible power supply or render more stable operations of the uninterruptible power supply. For example, the uninterruptible power supply may have a detecting circuit for detecting some operating messages. The operating messages of the uninterruptible power supply includes for example the magnitude of the input voltage, the magnitude of the input current, the magnitude of the output voltage, the magnitude of the output current, the charging current, the operating temperature, the residual charge capacity, the residual power-supplying duration and the like. In addition, these operating messages are indicated as an indication light or shown on a monitor. Moreover, these operating messages may be transmitted to external devices through communication ports such that the external devices can realize the operating statuses of the uninterruptible power supply in real time.

Depending on the use instances of the uninterruptible power supply, the advanced functions are diverse. For example, if the uninterruptible power supply is powered by the utility power source, the residual charge capacity and the residual power-supplying duration are not critical. Whereas, if the uninterruptible power supply is powered by the battery (or the energy storage unit), the residual charge capacity and the residual power-supplying duration become very important operating messages for operating the uninterruptible power supply.

Conventionally, the electric energy of the uninterruptible power supply is continuously transmitted to the electrical appliance when the electrical appliance is used. Since the detecting circuit continuously detects the operating messages when the electrical appliance is powered off, the detecting circuit and the controller of the uninterruptible power supply consume additional electric energy. Under this circumstance, the overall efficiency of the uninterruptible power supply is deteriorated and the running time is reduced.

Therefore, there is a need of providing an uninterruptible power supply to obviate the drawbacks encountered from the prior art.

SUMMARY OF THE INVENTION

An object of the present invention provides an uninterruptible power supply with low power loss in order to increase the overall efficiency and the running time of the uninterruptible power supply.

In accordance with an aspect of the present invention, there is provided an uninterruptible power supply. The uninterruptible power supply includes an energy storage unit, an AC-to-DC converting circuit, a charging circuit, a selection circuit, a primary detecting circuit, a primary control circuit and a secondary control circuit. The energy storage unit has an end selectively connected to an energy storage unit connecting node and the other end connected to a common terminal for storing electric energy. The AC-to-DC converting circuit is used for converting an input AC voltage into a first DC voltage. The charging circuit is connected to the AC-to-DC converting circuit and the energy storage unit connecting node for converting the first DC voltage into an energy storage unit connecting node voltage required for charging the energy storage unit. The selection circuit is connected to the AC-to-DC converting circuit, the energy storage unit connecting node and a load for selectively outputting the first DC voltage or the energy storage unit connecting node voltage to the load. The primary detecting circuit is connected to an output loop of the uninterruptible power supply for detecting an operating status of the uninterruptible power supply and issuing a corresponding operating message. The primary control circuit is connected to the primary detecting circuit and the selection circuit for controlling operations of the uninterruptible power supply. The secondary control circuit is connected to the primary detecting circuit, the selection circuit and the primary control circuit for controlling operations of the uninterruptible power supply. The primary control circuit and the secondary control circuit are enabled or disabled according to the operating message.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
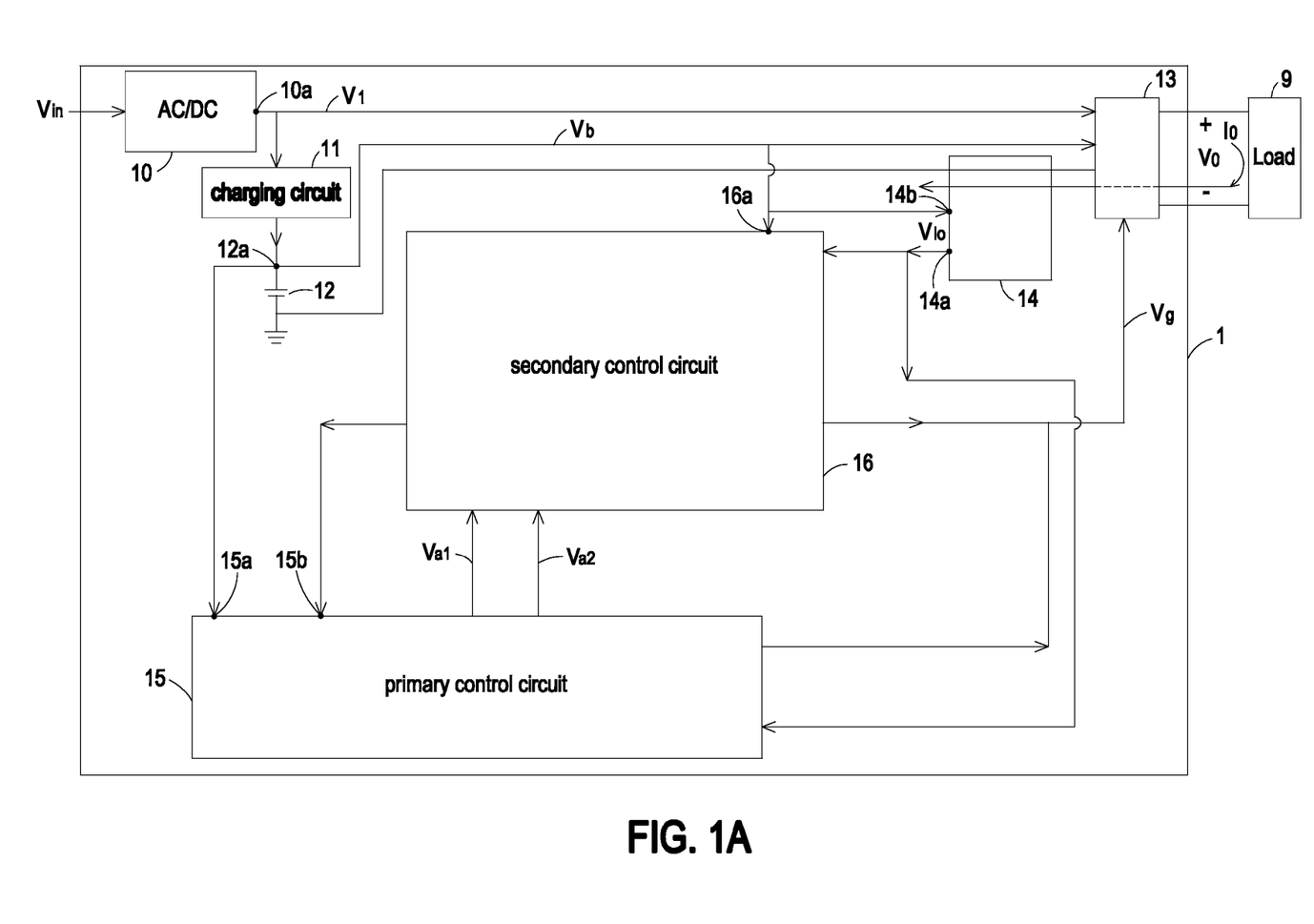
FIG. 1A is a schematic circuit diagram of an uninterruptible power supply according to a first preferred embodiment of the present invention.

FIG. 1A is a schematic circuit diagram of an uninterruptible power supply according to a first preferred embodiment of the present invention. The uninterruptible power supply has low power loss. As shown in FIG. 1A, the uninterruptible power supply 1 principally comprises an AC-to-DC converting circuit 10, a charging circuit 11, an energy storage unit 12, a selection circuit 13, a primary detecting circuit 14, a primary control circuit 15 and a secondary control circuit 16. A first output terminal 10a of the AC-to-DC converting circuit 10 is connected to the input terminal of the charging circuit 11 and a first input terminal of the selection circuit 13. By the AC-to-DC converting circuit 10, the input AC voltage $V_{in}$ is converted into a first DC voltage $V_1$. The output terminal of the charging circuit 11 is connected to an energy storage unit connecting node 12a and a second input terminal of the selection circuit 13. By the charging circuit 11, the first DC voltage $V_1$ is converted into an energy storage unit connecting node voltage $V_b$ required for charging the energy storage unit 12. The energy storage unit 12 is connected to the output terminal of the charging circuit 11 through the energy storage unit connecting node 12a. If the input AC voltage $V_{in}$ is suffered from a sudden variation or interruption, the energy storage unit 12 will provide electric energy to the load 9. The output terminal of the selection circuit 13 is connected to the load 9. The selection circuit 13 may selectively output the first DC voltage $V_1$ to the load 9 through the first input terminal or output the energy storage unit connecting node voltage $V_b$ to the load 9 through the second input terminal.

The primary detecting circuit 14 is used for detecting an operating status of the uninterruptible power supply 1. The operating status of the uninterruptible power supply 1 includes for example the magnitude of the input AC voltage $V_{in}$, the magnitude of the input current, the magnitude of the output voltage $V_o$, the magnitude of the output current $I_o$, the voltage difference across the energy storage unit 12, the charging current, the operating temperature and the like. For clarification, this embodiment is illustrated by referring the magnitude of the output current $I_o$ as the operating status of the uninterruptible power supply 1. The primary detecting circuit 14 has an output current detecting circuit (not shown), which is serially connected to the loop of the output voltage $V_o$, for detecting the output current $I_o$ and generating a corresponding output current detecting signal $V_{Io}$.

The primary control circuit 15 is connected to the control terminal of the selection circuit 13, the detecting signal output terminal of the primary detecting circuit 14 and the secondary control circuit 16 for controlling operations of the uninterruptible power supply 1. The power terminal 15a of the primary control circuit 15 is connected to the first output terminal 10a of the AC-to-DC converting circuit 10 or the energy storage unit connecting node 12a. The primary control circuit 15 is powered by the electric energy of AC-to-DC converting circuit 10, the energy storage unit 12 or the charging circuit 11. The power terminal 15a of the primary control circuit 15 is connected to the energy storage unit connecting node 12a. The primary control circuit 15 is powered by the electric energy of the energy storage unit 12 or the charging circuit 11. After the operating message (e.g. the output current detecting signal $V_{Io}$) issued from the primary detecting circuit 14 is received by the primary control circuit 15, the primary control circuit 15 will adaptively enable the secondary control circuit 16 according to the settings of the uninterruptible power supply 1 and the operating message. At this moment, the secondary control circuit 16 takes the place of the primary control circuit 15 to perform the controlling functions and thus the primary control circuit 15 is powered off and disabled.

The secondary control circuit 16 is connected to the control terminal of the selection circuit 13, the detecting signal output terminal of the primary detecting circuit 14, the energy storage unit connecting node 12a and the primary control circuit 15 for controlling operations of the uninterruptible power supply 1. The first power terminal 16a of the secondary control circuit 16 is connected to the first output terminal 10a of the AC-to-DC converting circuit 10 (not shown) or the energy storage unit connecting node 12a. The secondary control circuit 16 is powered by the electric energy of the AC-to-DC converting circuit 10, the energy storage unit 12 or the charging circuit 11. In this embodiment, the first power terminal 16a of the secondary control circuit 16 is connected to the energy storage unit connecting node 12a. The secondary control circuit 16 is powered by the energy storage unit 12 or the charging circuit 11. After the operating message (e.g. the output current detecting signal $V_{Io}$) issued from the primary detecting circuit 14 is received by the secondary control circuit 16, the secondary control circuit 16 will adaptively enable the primary control circuit 15 according to the settings of the uninterruptible power supply 1 and the operating message. At this moment, the primary control circuit 15 takes the place of the secondary control circuit 16 to perform the controlling functions and thus the secondary control circuit 16 is powered off and disabled.

In this embodiment, after the operating message (e.g. the output current detecting signal $V_{Io}$) issued from the primary detecting circuit 14 is received by the primary control circuit 15, the primary control circuit 15 and the secondary control circuit 16 are alternately enabled according to the operating message. That is, one of the primary control circuit 15 and the secondary control circuit 16 is enabled to control operations of the uninterruptible power supply 1. The operating message generated by the primary detecting circuit 14 is for example the magnitude of the output current $I_o$. In some embodiments, the primary detecting circuit 14 may include other detecting circuit such as a charging current detecting circuit (not shown) for detecting the operating message of the charging current. In this context, the operating message generated by the primary detecting circuit 14 is illustrated by referring to the magnitude of the output current $I_o$.

Figure 1B:
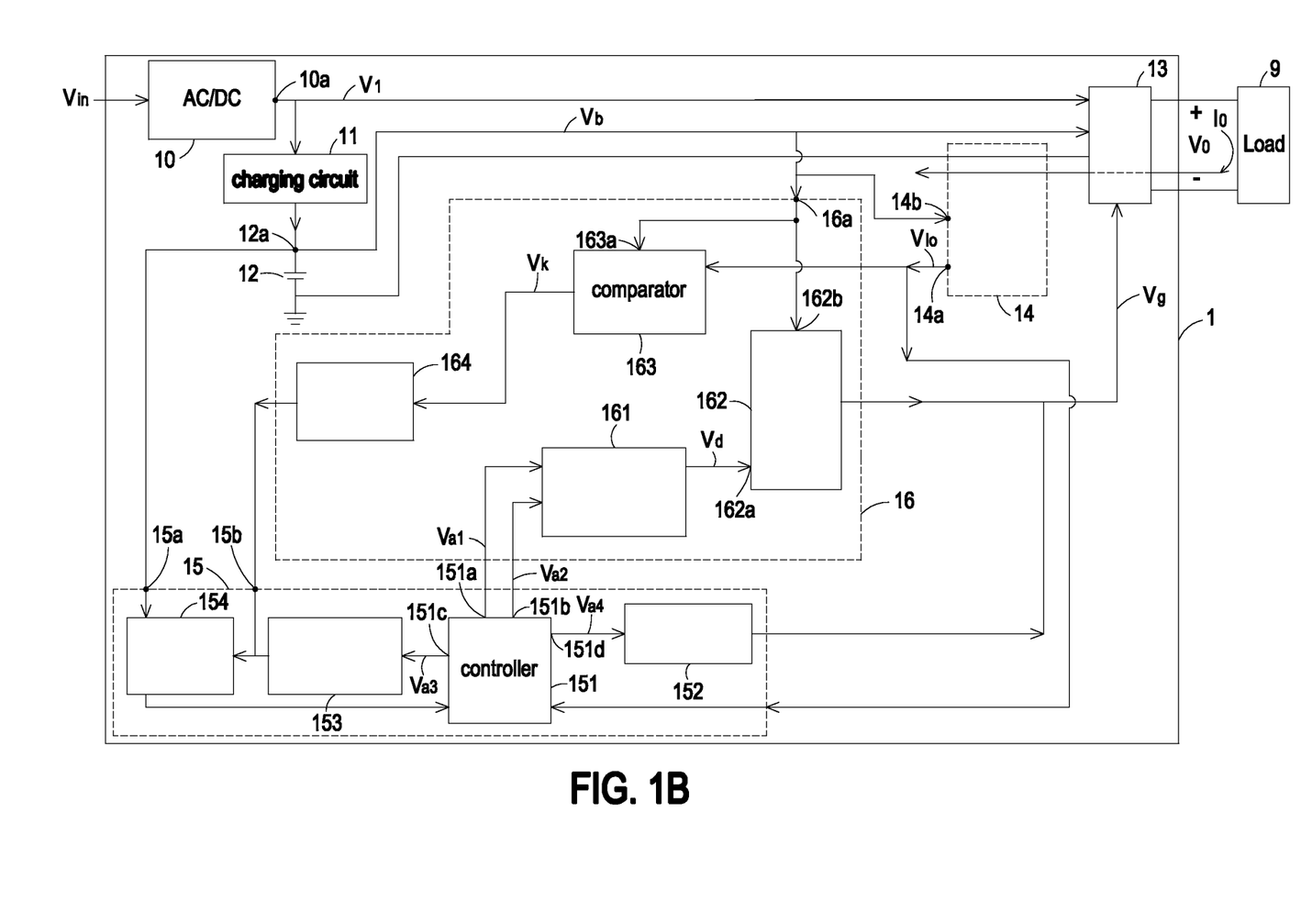
FIG. 1B is a schematic detailed circuit block diagram of the uninterruptible power supply shown in FIG. 1A.

FIG. 1B is a schematic detailed circuit block diagram of the uninterruptible power supply shown in FIG. 1A. As shown in FIG. 1A, the primary control circuit 15 comprises a controller 151, a first primary controlling and driving circuit 152, a second primary controlling and driving circuit 153 and a power switching circuit 154. The secondary control circuit 16 comprises a triggering circuit 161, a driving and detecting circuit 162, a comparator 163 and a secondary controlling and driving circuit 164. The output terminals of the controller 151 are respectively connected to the control terminal of the first primary controlling and driving circuit 152, the control terminal of the second primary controlling and driving circuit 153 and the signal receiving terminal of the triggering circuit 161. The input terminal of the controller 151 is connected to the detecting signal output terminal 14a of the primary detecting circuit 14. The power terminal of the controller 151 is connected to the output terminal of the power switching circuit 154. According to the operating message of the uninterruptible power supply 1, the controller 151 generates a first control voltage $V_{a1}$, a second control voltage $V_{a2}$, a third control voltage $V_{a3}$ and a fourth control voltage $V_{a4}$ to control operations of the uninterruptible power supply 1.

The first primary controlling and driving circuit 152 is connected to the fourth output terminal 151d of the controller 151 and the control terminal of the selection circuit 13 for controlling operations of the selection circuit 13. The second primary controlling and driving circuit 153 is connected to the third output terminal 151c of the controller 151 and the control terminal of the power switching circuit 154 for controlling operations of the power switching circuit 154. The power switching circuit 154 is connected to the power terminal 15a of the primary control circuit 15 and the control terminal of the controller 151. The control terminal of the power switching circuit 154 is connected to the second primary controlling and driving circuit 153. Under control of the second primary controlling and driving circuit 153, the power switching circuit 154 is conducted or shut off. When the power switching circuit 154 is conducted, electric energy is transmitted to the power terminal of the controller 151 through the power switching circuit 154. Whereas, when the power switching circuit 154 is shut off under second primary controlling and driving circuit 153, the controller 151 is powered off and thus disabled.

Figure 4:
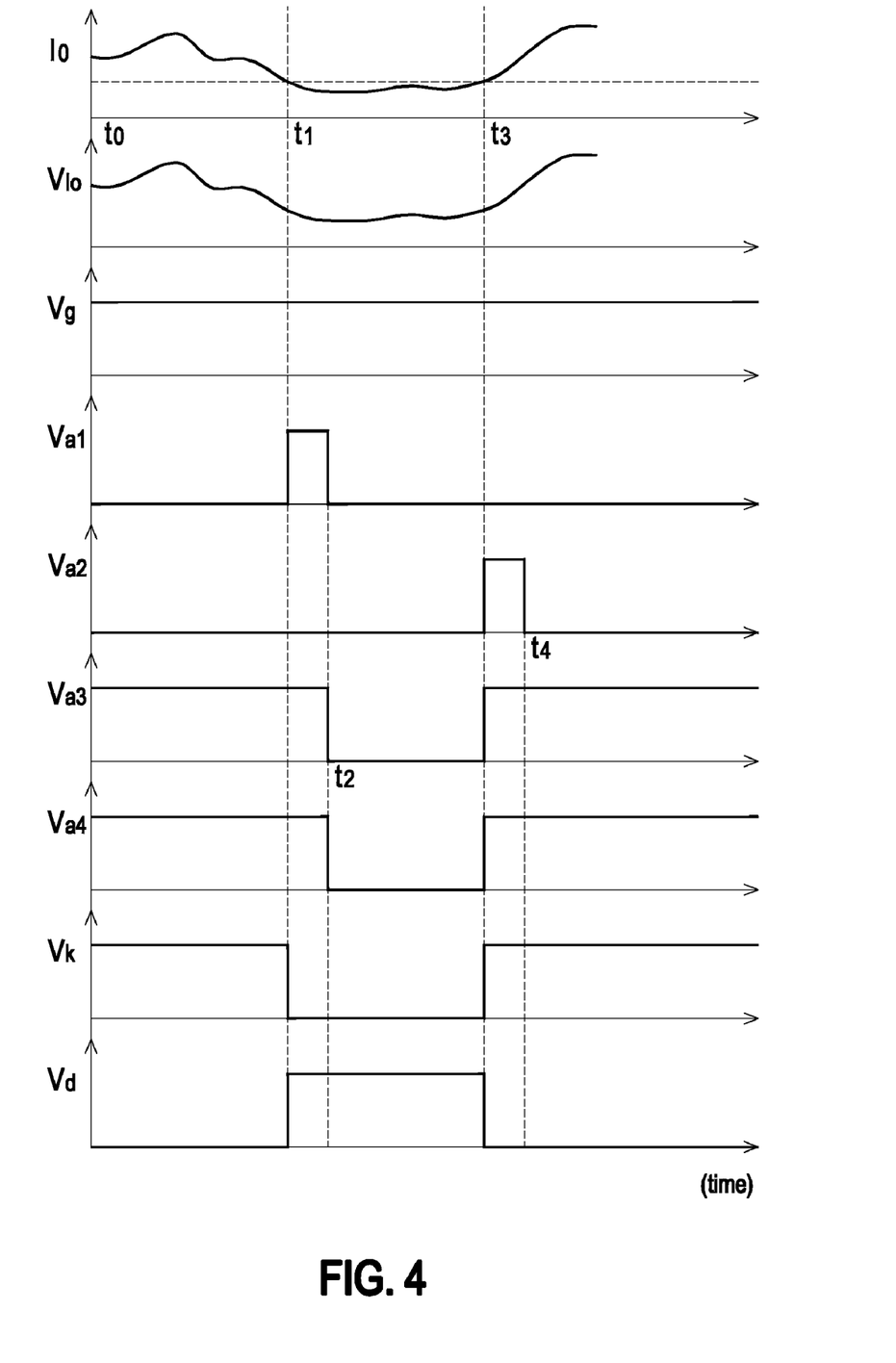
FIG. 4 is a timing waveform diagram schematically illustrating the corresponding voltage signals and current signals processed in the uninterruptible power supply of FIG. 1C.

The signal receiving terminal of the triggering circuit 161 is connected to the first output terminal 151a and the second output terminal 151b of the controller 151. The output terminal of the triggering circuit 161 is connected to the control terminal 162a of the driving and detecting circuit 162. According to the first control voltage $V_{a1}$ and the second control voltage $V_{a2}$, the triggering circuit 161 issues a corresponding triggering output voltage $V_d$ (as is also shown in FIG. 4). The operations of the driving and detecting circuit 162 are controlled according to the triggering output voltage $V_d$. The driving and detecting circuit 162 is connected to the output terminal of the triggering circuit 161 and the control terminal of the selection circuit 13. According to the triggering output voltage $V_d$, the selection circuit 13 is selectively conducted or shut off.

The power terminal 162b of the driving and detecting circuit 162 is connected to the first power terminal 16a of the secondary control circuit 16. The electric energy of the charging circuit 11 or the energy storage unit 12 is transmitted to the driving and detecting circuit 162 through the first power terminal 16a of the secondary control circuit 16. In some embodiments, the power terminal 162b of the driving and detecting circuit 162 is connected to the first output terminal 10a of the AC-to-DC converting circuit 10 (not shown) and thus the driving and detecting circuit 162 is powered by the AC-to-DC converting circuit 10.

The input terminal of the comparator 163 is connected to the detecting signal output terminal 14a of the primary detecting circuit 14. The output terminal of the comparator 163 is connected to the control terminal of the secondary controlling and driving circuit 164. The operating message of the output current detecting signal $V_{Io}$ is compared with a predetermined reference voltage $V_{ref}$ by the comparator 163, thereby generating a comparing voltage $V_k$ for controlling operations of the secondary controlling and driving circuit 164. In this embodiment, the power terminal 163a of the comparator 163 is connected to the first power terminal 16a of the secondary control circuit 16. The electric energy of the charging circuit 11 or the energy storage unit 12 is transmitted to the comparator 163 through the first power terminal 16a of the secondary control circuit 16. In some embodiments, the power terminal 163a of the comparator 163 is connected to the first output terminal 10a of the AC-to-DC converting circuit 10 (not shown) and thus the comparator 163 is powered by the AC-to-DC converting circuit 10.

The secondary controlling and driving circuit 164 is connected to the input terminal of the power switch circuit 154 of the primary control circuit 15 and the output terminal of the comparator 163. The control terminal of the secondary controlling and driving circuit 164 is connected to the output terminal of the comparator 163. According to the comparing voltage $V_k$, the secondary controlling and driving circuit 164 will selectively enable or disable the primary control circuit 15.

Figure 1C:
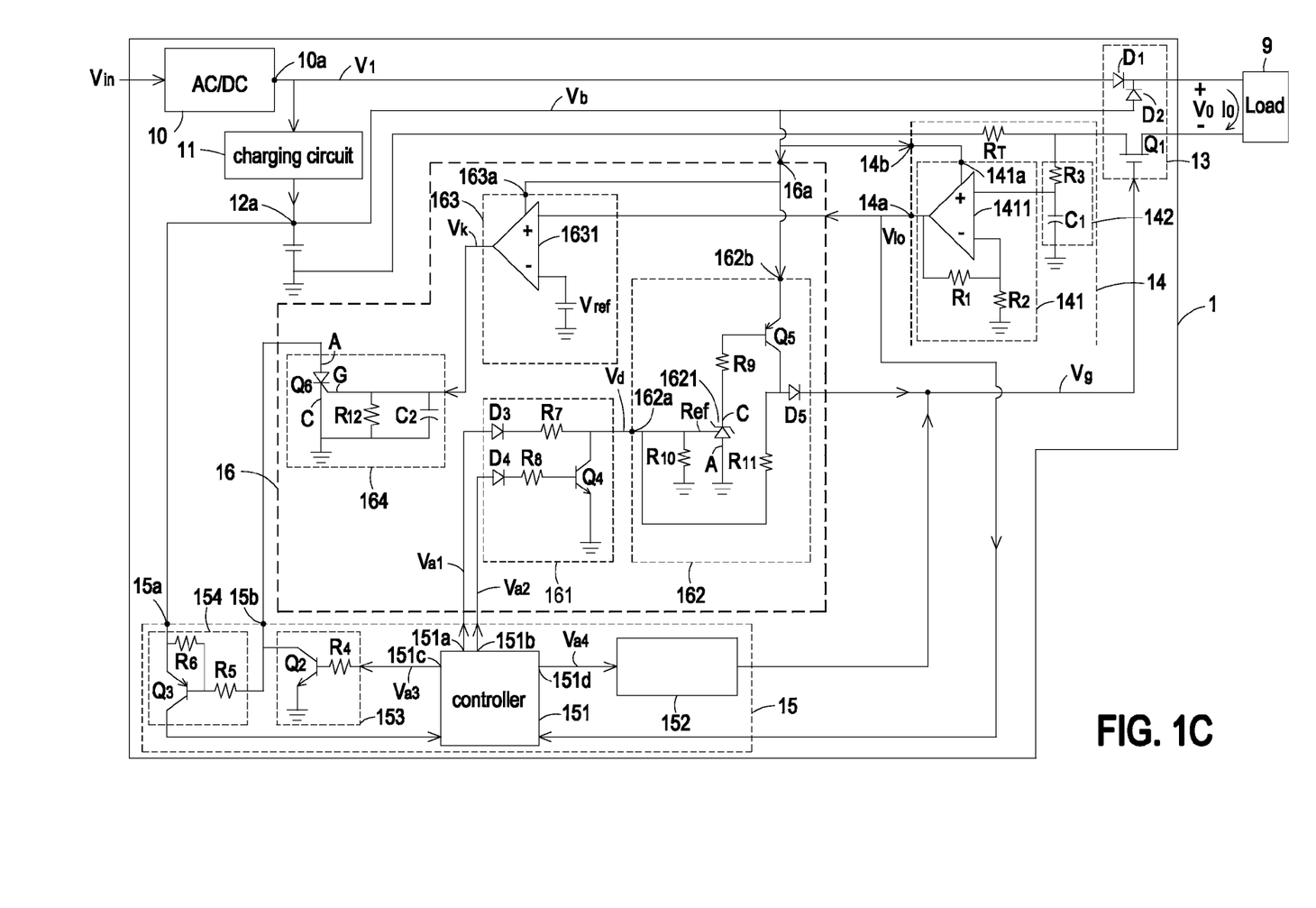
FIG. 1C is a schematic detailed circuit block diagram of the uninterruptible power supply shown in FIG. 1B.

FIG. 1C is a schematic detailed circuit block diagram of the uninterruptible power supply shown in FIG. 1B. The selection circuit 13 comprises a first diode $D_1$, a second diode $D_2$ and a first switch element $Q_1$. The anode of the first diode $D_1$ is connected to the first output terminal 10a of the AC-to-DC converting circuit 10. The cathode of the first diode $D_1$ is connected to the cathode of the second diode $D_2$ and the load 9. The anode of the second diode $D_2$ is connected to the energy storage unit connecting node 12a. By means of the first diode $D_1$ and the second diode $D_2$, the first DC voltage $V_1$ to the load 9, the output voltage of the charging circuit or the voltage of the energy storage unit 12 is selectively transmitted to the load 9. The first switch element $Q_1$ is connected to the common terminal and the loop of the load 9. The control terminal of the first switch element $Q_1$ is connected to the primary control circuit 15 and the secondary control circuit 16. The first switch element $Q_1$ is conducted or shut off under control of the primary control circuit 15 or the secondary control circuit 16. In some embodiments, the first diode $D_1$ and the second diode $D_2$ are respectively replaced by two switch elements (not shown), and these two switch elements are also conducted or shut off under control of the primary control circuit 15 or the secondary control circuit 16.

An example of the primary detecting circuit 14 includes but is not limited to an output current detecting circuit. The output current detecting circuit comprises a detecting resistor $R_T$, a voltage-amplifying circuit 141 and a filtering circuit 142. The detecting resistor $R_T$ is serially connected to the loop of the output voltage for detecting the output current $I_o$ and generating a corresponding detecting signal. The output current $I_o$ is filtered by the filtering circuit 142 and then amplified by the voltage-amplifying circuit 141, thereby generating a corresponding current-detecting signal $V_{Io}$. In this embodiment, the voltage-amplifying circuit 141 comprises a first operational amplifier 1411, a first resistor $R_1$ and a second resistor $R_2$. The positive input terminal of the first operational amplifier 1411 is connected to the output terminal of the filtering circuit 142. An end of the first resistor $R_1$ is connected to the output terminal of the first operational amplifier 1411. The other end of the first resistor $R_1$ is connected to the negative input terminal of the first operational amplifier 1411. An end of the second resistor $R_2$ is connected to the negative terminal of the first operational amplifier 1411. The other end of the second resistor $R_2$ is connected to the common terminal. In this embodiment, the filtering circuit 142 comprises a third resistor $R_3$ and a first capacitor $C_1$, which are connected with each other in series. The input terminal of the filtering circuit 142 is connected to the detecting resistor $R_T$. The output terminal of the filtering circuit 142 is connected to the input terminal of the voltage-amplifying circuit 141. In some embodiments, the filtering circuit 142 is exempted from the primary detecting circuit 14, and the detecting resistor $R_T$ is directly connected to the input terminal of the voltage-amplifying circuit 141.

The power terminal 14b of the primary detecting circuit 14 is connected to the energy storage unit connecting node 12a, the power terminal 141a of the voltage-amplifying circuit 141 and the power terminal of the first operational amplifier 1411.

The electric energy of the charging circuit 11 or the energy storage unit 12 is transmitted to the primary detecting circuit 14 and the first operational amplifier 1411 through the power terminal 14b of the primary detecting circuit 14. In some embodiments, the power terminal 14b of the primary detecting circuit 14 is connected to the first output terminal 10a of the AC-to-DC converting circuit 10 and thus the electric energy of the AC-to-DC converting circuit 10 is transmitted to the primary detecting circuit 14 and the first operational amplifier 1411.

The second primary controlling and driving circuit 153 of the primary control circuit 15 comprises a fourth resistor $R_4$ and a second switch element $Q_2$. The collector of the second switch element $Q_2$ is connected to the control terminal of the power switching circuit 154. The emitter of the second switch element $Q_2$ is connected to the common terminal. An end of the fourth resistor $R_4$ is connected to the base of the second switch element $Q_2$. The other end of the fourth resistor $R_4$ is connected to the third output terminal 151c of the controller 151.

The power switching circuit 154 comprises a third switch element $Q_3$, a fifth resistor $R_5$ and a sixth resistor $R_6$. The emitter of the third switch element $Q_3$ is connected to the power terminal 15a of the primary control circuit 15. The collector of the third switch element $Q_3$ is connected to the power terminal of the controller 151. An end of the fifth resistor $R_5$ is connected to the power control terminal 15b of the primary control circuit 15 and the second primary controlling and driving circuit 153. The other end of the fifth resistor $R_5$ is connected to the base of the third switch element $Q_3$. The sixth resistor $R_6$ is interconnected between the emitter and the base of the third switch element $Q_3$.

The triggering circuit 161 comprises a fourth switch element $Q_4$, a seventh resistor $R_7$, an eighth resistor $R_8$, a third diode $D_3$ and a fourth diode $D_4$. The third diode $D_3$ and the seventh resistor $R_7$ are connected with each other and also connected to the collector of the fourth switch element $Q_4$ and the first output terminal 151a of the controller 151. The fourth diode $D_4$ and the eighth resistor $R_8$ are connected with each other and also connected to the base of the fourth switch element $Q_4$ and the second output terminal 151b of the controller 151.

The driving and detecting circuit 162 comprises a fifth switch element $Q_5$, a fifth diode $D_5$, a ninth resistor $R_9$, a tenth resistor $R_{10}$, an eleventh resistor $R_{11}$ and a three-terminal voltage regulator 1621 (e.g. a TI TL1431 IC). The emitter of the fifth switch element $Q_5$ is connected to the first power terminal 16a of the secondary control circuit 16. The anode of the fifth diode $D_5$ is connected to the collector of the fifth switch element $Q_5$. The cathode of the fifth diode $D_5$ is connected to the control terminal of the first switch element $Q_1$. An end of the ninth resistor $R_9$ is connected to the base of the fifth switch element $Q_5$. The other end of the ninth resistor $R_9$ is connected to the cathode C of the three-terminal voltage regulator 1621. The anode A of the three-terminal voltage regulator 1621 is connected to the common terminal. The reference terminal Ref of the three-terminal voltage regulator 1621 is connected to the output terminal of the triggering circuit 161. An end of the tenth resistor $R_{10}$ is connected to the reference terminal Ref of the three-terminal voltage regulator 1621. The other end of the tenth resistor $R_{10}$ is connected to the common terminal. An end of the eleventh resistor $R_{11}$ is connected to the output terminal of the triggering circuit 161 and the reference terminal Ref of the three-terminal voltage regulator 1621. The other end of the eleventh resistor $R_{11}$ is connected to the anode of the fifth diode $D_5$ and the collector of the fifth switch element $Q_5$. According to the triggering output voltage $V_d$, the first switch element $Q_1$ of the selection circuit 13 is selectively conducted or shut off.

The comparator 163 comprises a second operational amplifier 1631. The positive input terminal of the second operational amplifier 1631 is connected to the detecting signal output terminal 14a of the primary detecting circuit 14. The negative input terminal of the second operational amplifier 1631 is connected to the reference voltage $V_{ref}$. The output terminal of the second operational amplifier 1631 is connected to the control terminal of the secondary controlling and driving circuit 164. The output current detecting signal $V_{Io}$ is compared with the reference voltage $V_{ref}$ by the second operational amplifier 1631, thereby generating the comparing voltage $V_k$ for controlling operations of the secondary controlling and driving circuit 164. In some embodiments, the comparator 163 comprises further comprises a reference voltage generator (not shown), which is connected to the negative input terminal of the second operational amplifier 1631, for generating the reference voltage $V_{ref}$.

The secondary controlling and driving circuit 164 comprises a twelfth resistor $R_{12}$, a second capacitor $C_2$ and a sixth switch element $Q_6$. An example of the sixth switch element $Q_6$ is a silicon-controlled rectifier (SCR). The anode A of the sixth switch element $Q_6$ is connected to the power control terminal 15b of the primary control circuit 15. The cathode C of the sixth switch element $Q_6$ is connected to the common terminal. The control terminal G of the sixth switch element $Q_6$ is connected to the output terminal of the comparator 163. According to the comparing voltage $V_k$, the secondary controlling and driving circuit 164 will selectively enable or disable the primary control circuit 15.

Figure 2A:
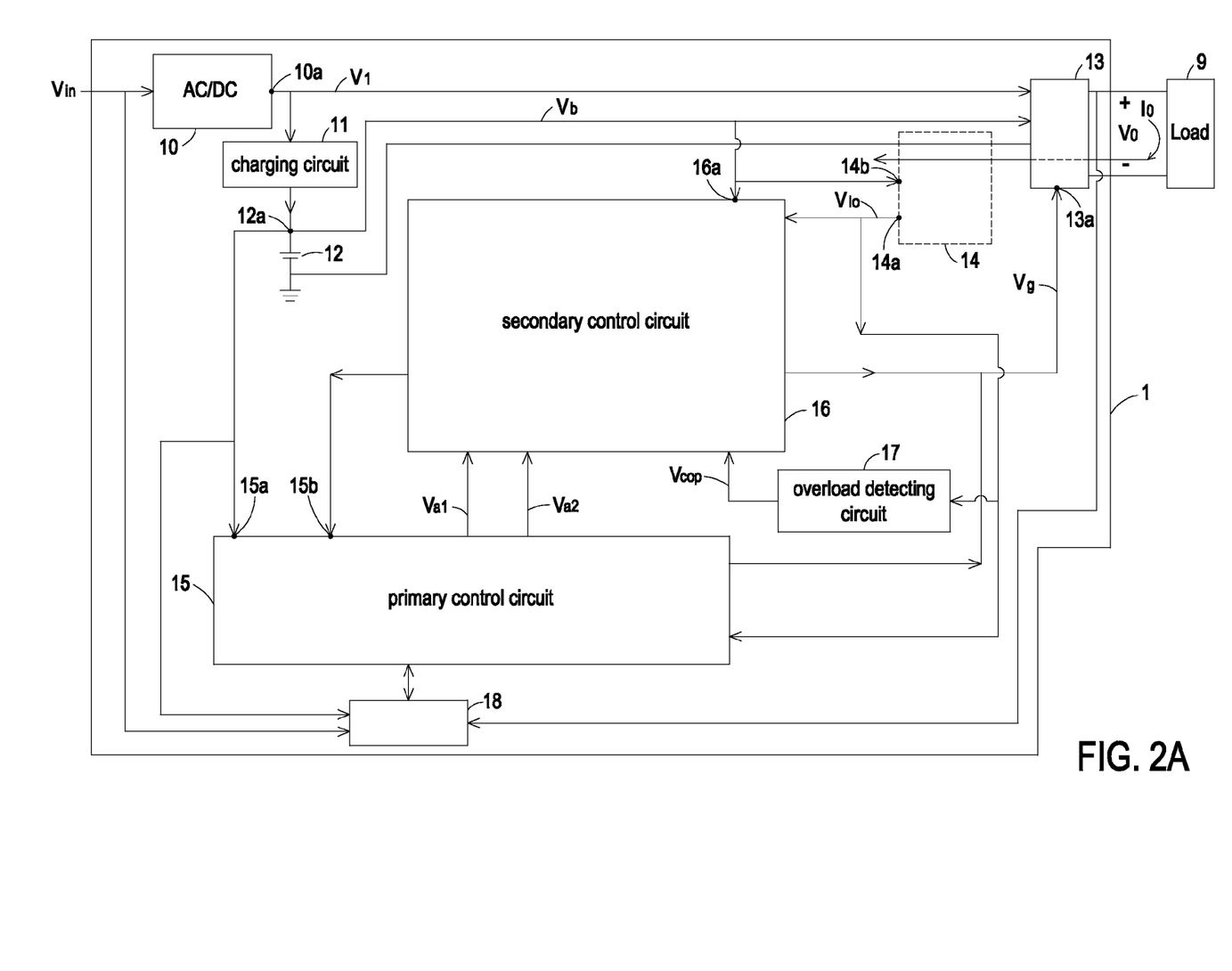
FIG. 2A is a schematic circuit diagram of an uninterruptible power supply according to a second preferred embodiment of the present invention.

FIG. 2A is a schematic circuit diagram of an uninterruptible power supply according to a second preferred embodiment of the present invention. The uninterruptible power supply has low power loss. As shown in FIG. 2A, the uninterruptible power supply 1 also comprises an AC-to-DC converting circuit 10, a charging circuit 11, an energy storage unit 12, a selection circuit 13, a primary detecting circuit 14, a primary control circuit 15 and a secondary control circuit 16. In comparison of FIG. 1A, the uninterruptible power supply 1 of this embodiment further comprises an overload detecting circuit 17 and a secondary detecting circuit 18. The overload detecting circuit 17 is interconnected between the detecting signal output terminal 14a of the primary detecting circuit 14 and the secondary control circuit 16 for enhancing reliability of the uninterruptible power supply 1. The secondary detecting circuit 18 is connected to the primary control circuit 15, the input terminal of the AC-to-DC converting circuit 10, the energy storage unit connecting node 12a and the output terminal of the selection circuit 13 for detecting other operating statuses, which are not detected by the primary detecting circuit 14. In this embodiment, the primary detecting circuit 14 only detects the magnitude of the output current $I_o$. The operating statuses detected by the secondary detecting circuit 18, for example the magnitude of the input AC voltage $V_{in}$, the voltage difference across the energy storage unit 12 or the magnitude of the output voltage $V_o$, are transmitted to the primary control circuit 15. Under control of the primary control circuit 15, the secondary detecting circuit 18 is disabled.

Figure 2B:
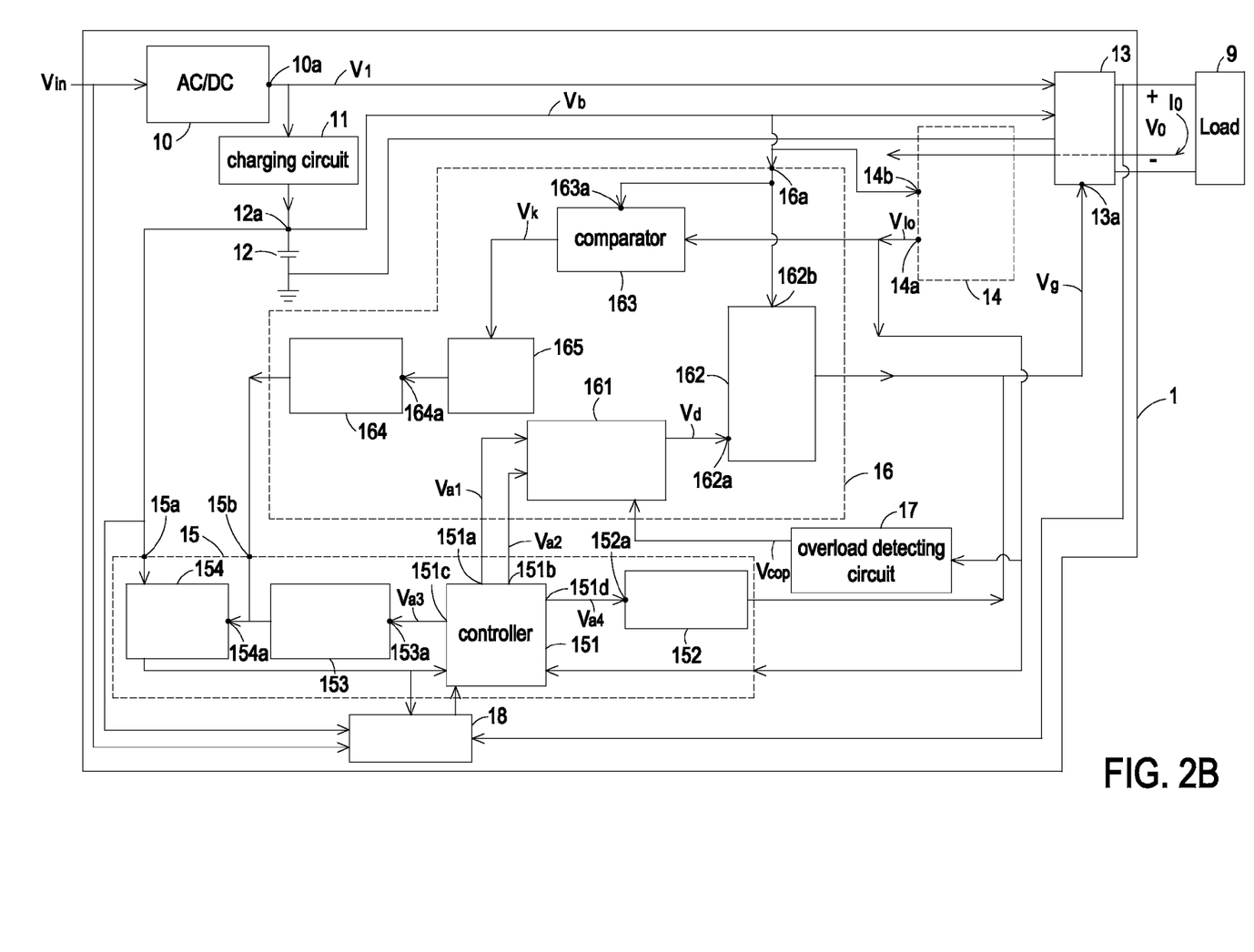
FIG. 2B is a schematic detailed circuit block diagram of the uninterruptible power supply shown in FIG. 2A.

FIG. 2B is a schematic detailed circuit block diagram of the uninterruptible power supply shown in FIG. 2A. In comparison with FIG. 1B, the uninterruptible power supply 1 of FIG. 2B further comprises the overload detecting circuit 17 and the secondary detecting circuit 18. In addition, the secondary control circuit 16 of the uninterruptible power supply 1 of FIG. 2B further comprises an isolator circuit 165. The isolator circuit 165 of the secondary control circuit 16 is connected to the comparator 163 and control terminal of the secondary controlling and driving circuit 164 for isolating the DC component of the comparing voltage $V_k$. In a case that the comparing voltage $V_k$ issued by comparator 163 is kept unchanged, the magnitude of the current outputted from the comparator 163 is zero and thus the power loss is reduced. In addition, the isolator circuit 165 may reset the secondary controlling and driving circuit 164 such that the secondary controlling and driving circuit 164 stops driving the power switching circuit 154 of the primary control circuit 15. The input terminal of the overload detecting circuit 17 is connected to the detecting signal output terminal 14a of the primary detecting circuit 14. The output terminal of the overload detecting circuit 17 is connected to the triggering circuit 161. According to the magnitude of the output current detecting signal $V_{Io}$, the overload detecting circuit 17 discriminates whether the output current $I_o$ is at an overload state or a short-circuited state. When the output current $I_o$ is at an overload state or a short-circuited state, the overload detecting circuit 17 generates a protecting signal $V_{cop}$. In response to the protecting signal $V_{cop}$, the triggering circuit 161 generates the triggering output voltage $V_d$. In response to the triggering output voltage $V_d$, the driving and detecting circuit 162 stops driving the selection circuit 13 and thus the selection circuit 13 is disabled.

The energy storage unit 12 includes one battery or multiple batteries that are connected to each other in series or in parallel. The battery or batteries are for example lithium ion batteries, lead acid batteries, nickel-metal hydride batteries, nickel-cadmium batteries, lithium-cobalt batteries, lithium iron phosphate batteries (C—LiFePO$_4$). In addition, the energy storage unit 12 is hot-pluggable or replaceable. In a case that the energy storage unit 12 has a breakdown, an extended use period or insufficient charge capacity, the energy storage unit 12 can be replaced with a new one.

An example of the controller 151 includes but is not limited to a micro controller or a digital signal processor. The switch elements include silicon-controlled rectifiers (SCRs), bipolar junction transistors (BJTs) or metal oxide semiconductor field effect transistors (MOSFETs).

Figure 2C:
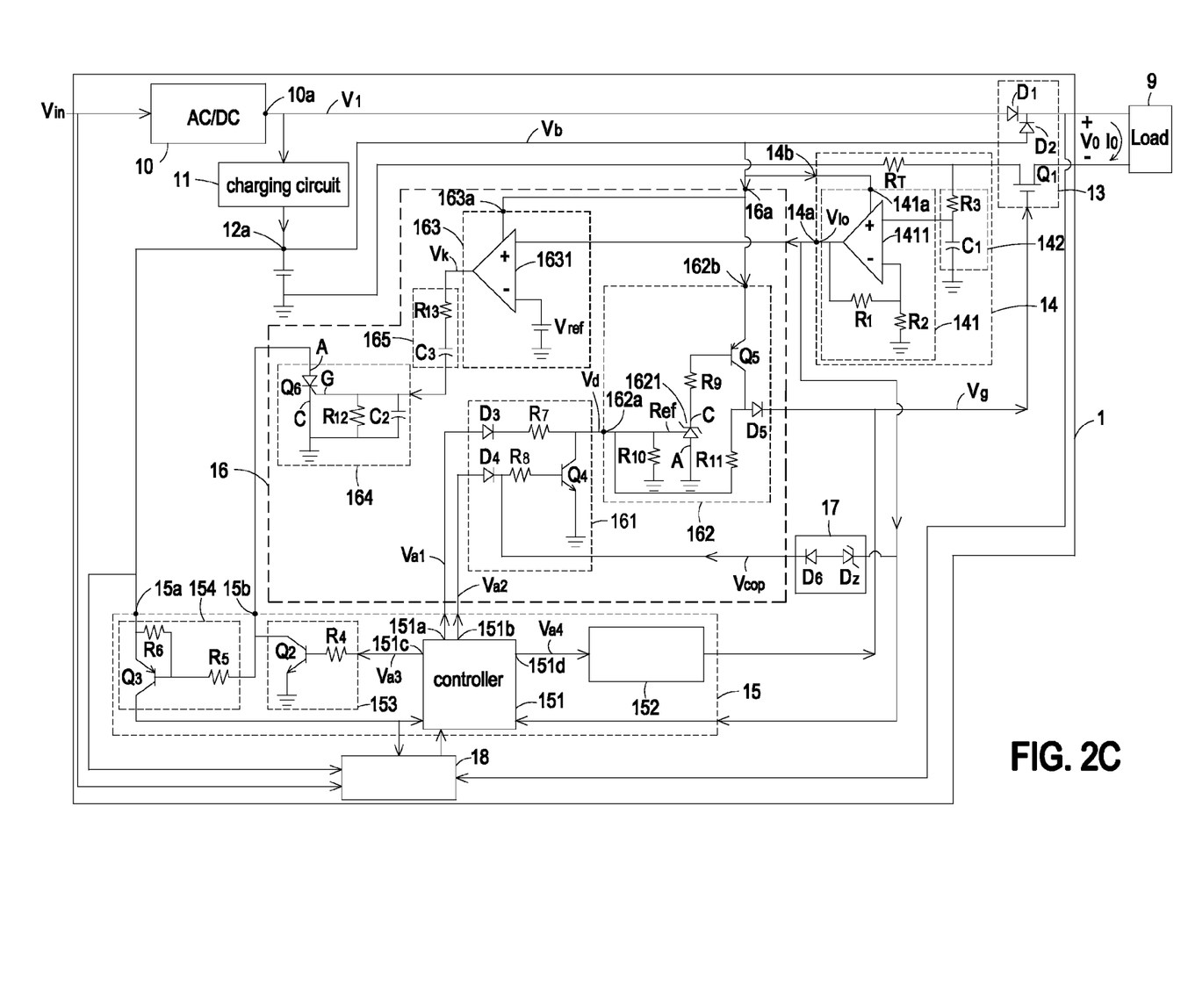
FIG. 2C is a schematic detailed circuit block diagram of the uninterruptible power supply shown in FIG. 2B.

In a case that the voltage difference across the energy storage unit 12 or the first DC voltage $V_1$ is beyond the acceptable range of the primary control circuit 15 or the secondary control circuit 16, the uninterruptible power supply 1 can further comprise a voltage regulating circuit (not shown). The voltage regulating circuit is arranged upstream of the primary control circuit 15 or the first power terminal 16a of the secondary control circuit 16. By the voltage regulating circuit, the voltage difference across the energy storage unit 12 or the first DC voltage $V_1$ is adjusted to an acceptable range of the primary control circuit 15 or the secondary control circuit 16. FIG. 2C is a schematic detailed circuit block diagram of the uninterruptible power supply shown in FIG. 2B. In comparison with FIG. 1C, the uninterruptible power supply of FIG. 2C further comprises the overload detecting circuit 17 and the secondary detecting circuit 18. In addition, the secondary control circuit 16 of the uninterruptible power supply 1 of FIG. 2C further comprises an isolator circuit 165. In this embodiment, the overload detecting circuit 17 comprises a sixth diode $D_6$ and a Zener diode $D_z$, which are serially connected between the input terminal of the triggering circuit 161 and the detecting signal output terminal 14a of the primary detecting circuit 14. The secondary detecting circuit 18 is connected to the primary control circuit 15, the input terminal of the AC-to-DC converting circuit 10, the energy storage unit connecting node 12a and the output terminal of the selection circuit 13 for detecting other operating statuses, which are not detected by the primary detecting circuit 14. In this embodiment, the primary detecting circuit 14 only detects the magnitude of the output current $I_o$. The operating statuses detected by the secondary detecting circuit 18, for example the magnitude of the input AC voltage $V_{in}$, the voltage difference across the energy storage unit 12 or the magnitude of the output voltage $V_o$, are transmitted to the primary control circuit 15. The operating messages associated with these operating statuses are transmitted to the primary control circuit 15. According to the operating messages, the operations of the uninterruptible power supply 1 are more stable. Under control of the primary control circuit 15, the secondary detecting circuit 18 is disabled.

In this embodiment, the overload detecting circuit 17 comprises the sixth diode $D_6$ and the Zener diode $D_z$, which are serially connected between the input terminal of the triggering circuit 161 and the detecting signal output terminal 14a of the primary detecting circuit 14. In particular, the sixth diode $D_6$ and the Zener diode $D_z$ are serially connected between the fourth diode $D_4$ and the detecting signal output terminal 14a of the primary detecting circuit 14. The isolator circuit 165 of the secondary control circuit 16 comprises a thirteenth resistor $R_{13}$ and a third capacitor $C_3$, which are serially connected between the output terminal of the comparator 163 and the control terminal of the secondary controlling and driving circuit 164. In some embodiments, the isolator circuit 165 of the secondary control circuit 16 has only a third capacitor $C_3$ serially connected between the output terminal of the comparator 163 and the control terminal of the secondary controlling and driving circuit 164. In some embodiments, the primary control circuit 15 further comprises an initiating circuit (not shown) for initiating the uninterruptible power supply 1.

Figure 3:
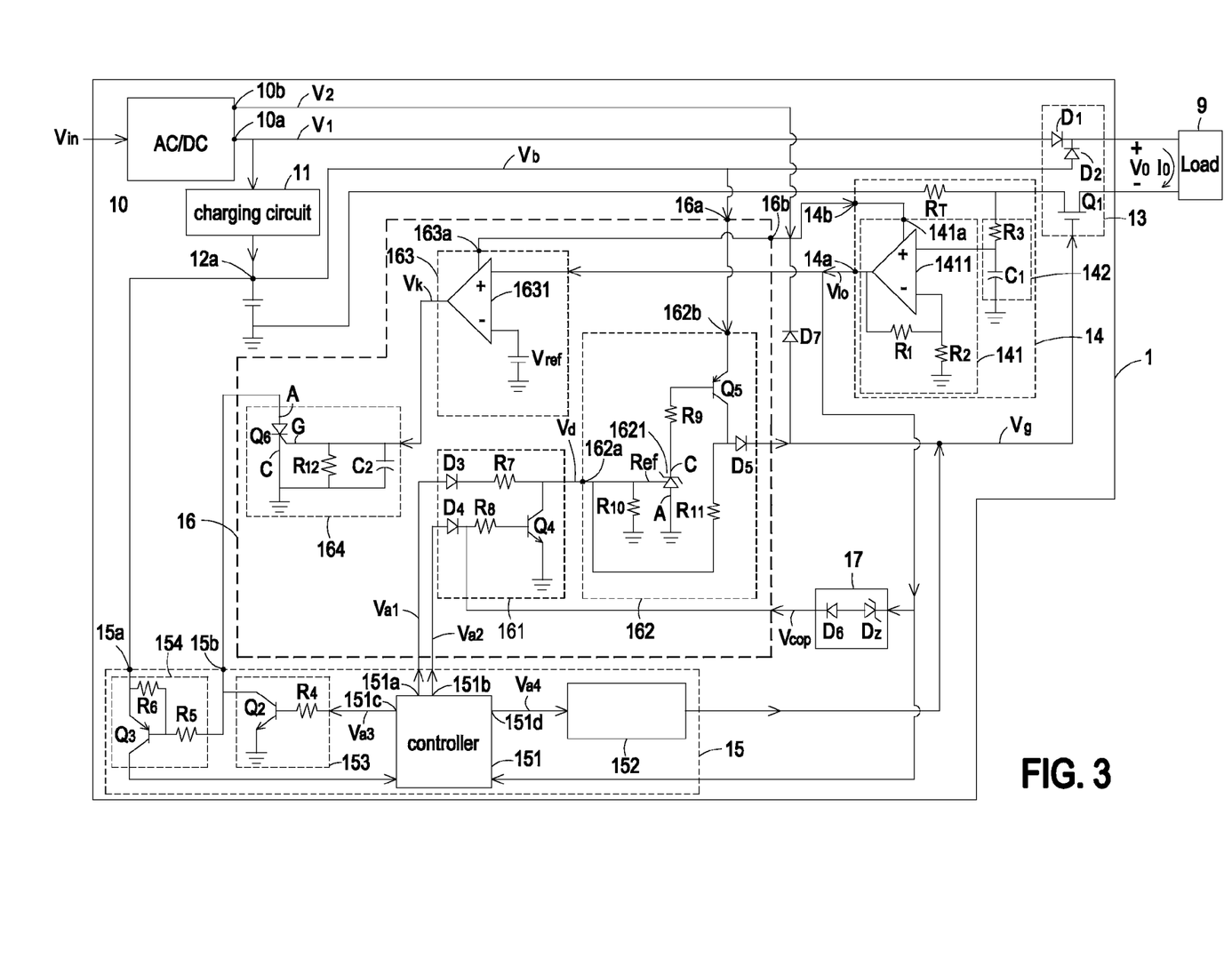
FIG. 3 is a schematic detailed circuit diagram of an uninterruptible power supply according to a third preferred embodiment of the present invention.

FIG. 3 is a schematic detailed circuit diagram of an uninterruptible power supply according to a third preferred embodiment of the present invention. In comparison with FIG. 1C, the uninterruptible power supply 1 of FIG. 3 further comprises the overload detecting circuit 17. In addition, the power terminal 14b of the primary detecting circuit 14 and the power terminal 163a of the comparator 163 are not connected to the second output terminal 10b of the AC-to-DC converting circuit 10. The uninterruptible power supply 1 of FIG. 3 further comprises a seventh diode $D_7$. The seventh diode $D_7$ is interconnected between the control terminal of the selection circuit 13 and the second output terminal 10b of the AC-to-DC converting circuit 10. The second output terminal 10b of the AC-to-DC converting circuit 10 is also connected to the power terminal 14b of the primary detecting circuit 14 and the second power terminal 16b of the secondary control circuit 16.

In a case that the second DC voltage $V_2$ generated by the second output terminal 10b of the AC-to-DC converting circuit 10 is not interrupted, the primary detecting circuit 14 and the comparator 163 are respectively powered by the AC-to-DC converting circuit 10 through the power terminal 14b of the primary detecting circuit 14 and the second power terminal 16b of the secondary control circuit 16. Whereas, in a case that the second DC voltage $V_2$ generated by the second output terminal 10b of the AC-to-DC converting circuit 10 is interrupted, the primary detecting circuit 14 and the comparator 163 are powered by the driving and detecting circuit 162 of the secondary control circuit 16 or the first primary controlling and driving circuit 152 of the primary control circuit 15 through the seventh diode $D_7$.

Since the power terminal 14b of the primary detecting circuit 14 and power terminal 163a of the comparator 163 are not connected to the energy storage unit connecting node 12a, no electric energy of the energy storage unit 12 is consumed when the uninterruptible power supply 1 is in a standby state or a suspending state. As a consequence, the running time of the uninterruptible power supply 1 is extended.

FIG. 4 is a timing waveform diagram schematically illustrating the corresponding voltage signals and current signals processed in the uninterruptible power supply of FIG. 1C.

From the time spot $t_0$ to the time spot $t_1$, the magnitude of the output current $I_o$ is greater than a threshold value (e.g. 0.3 A). The operating message (e.g. the magnitude of the output current $I_o$) issued from the primary detecting circuit 14 is received by the controller 151 of the primary control circuit 15. When the primary control circuit 15 discriminates that the magnitude of the output current $I_o$ is greater than the threshold value, the operations of the uninterruptible power supply 1 is controlled by the primary control circuit 15. Similarly, the operating message (e.g. the magnitude of the output current $I_o$) issued from the primary detecting circuit 14 is received by the comparator 163 of the secondary control circuit 16. When the secondary control circuit 16 discriminates that the magnitude of the output current $I_o$ is greater than the threshold value, a high-level comparing voltage $V_k$ is generated by the comparator 163. In response to the high-level comparing voltage $V_k$, the secondary controlling and driving circuit 164 will trigger the power switching circuit 154. Meanwhile, the primary control circuit 15 is enabled but the secondary control circuit 16 is disabled. In addition, the controller 151 of the primary control circuit 15 generates a low-level first control voltage $V_{a1}$, a low-level second control voltage $V_{a2}$, a high-level third control voltage $V_{a3}$ and a high-level fourth control voltage $V_{a4}$ to control operations of the uninterruptible power supply 1. In this embodiment, the secondary control circuit 16 is enabled in response to the high-level first control voltage $V_{a1}$ but the secondary control circuit 16 is disabled in response to the high-level second control voltage $V_{a2}$. In response to the high-level third control voltage $V_{a3}$, the power switching circuit 154 is triggered by the second primary controlling and driving circuit 153 to be continuously conducted. In response to the high-level fourth control voltage $V_{a4}$, the first switch element $Q_1$ of the selection circuit 13 is triggered by the first primary controlling and driving circuit 152 to be conducted. In other words, since the high-level first control voltage $V_{a1}$ and the triggering output voltage $V_d$ are low-level voltages from the time spot $t_0$ to the time spot $t_1$, the secondary control circuit 16 is disabled and the operations of the uninterruptible power supply 1 is controlled by the primary control circuit 15.

At the time spot $t_1$, the magnitude of the output current $I_o$ is smaller than the threshold value. The operating message (e.g. the magnitude of the output current $I_o$) issued from the primary detecting circuit 14 is received by the controller 151 of the primary control circuit 15. When the primary control circuit 15 discriminates that the magnitude of the output current $I_o$ is smaller than the threshold value, the secondary control circuit 16 is enabled in response to the high-level first control voltage $V_{a1}$. When the high-level first control voltage $V_{a1}$ is received by the triggering circuit 161 of the secondary control circuit 16, the triggering output voltage $V_d$ is switched from the low-level state to the high-level state. In response to the high-level triggering output voltage $V_d$, the first switch element $Q_1$ of the selection circuit 13 is triggered by the driving and detecting circuit 162. At this moment, the secondary control circuit 16 takes the place of the primary control circuit 15 to perform the controlling functions and thus the primary control circuit 15 is powered off and disabled. At the same time, the operating message (e.g. the magnitude of the output current $I_o$) issued from the primary detecting circuit 14 is received by the comparator 163 of the secondary control circuit 16. When the secondary control circuit 16 discriminates that the magnitude of the output current $I_o$ is smaller than the threshold value, a low-level comparing voltage $V_k$ is generated by the comparator 163. In response to the low-level comparing voltage $V_k$, the secondary controlling and driving circuit 164 will stop triggering the power switching circuit 154.

At the time spot $t_2$, the third control voltage $V_{a3}$ is switched from the high-level state to the low-level state. In response to the low-level third control voltage $V_{a3}$, the second primary controlling and driving circuit 153 stops driving the power switching circuit 154. In addition, the secondary controlling and driving circuit 164 also stops triggering the power switching circuit 154. Under this circumstance, the power switching circuit 154 is shut off, and thus the primary control circuit 15 is powered off and disabled. At the same time, the first control voltage $V_{a1}$, the second control voltage $V_{a2}$, the third control voltage $V_{a3}$ and the fourth control voltage $V_{a4}$ generated by the controller 151 are switched to the low-level states. At this moment, the secondary control circuit 16 takes the place of the primary control circuit 15 to control operations of the uninterruptible power supply 1.

At the time spot $t_3$, the magnitude of the output current $I_o$ is greater than the threshold value. The operating message (e.g. the magnitude of the output current $I_o$) issued from the primary detecting circuit 14 is received by the comparator 163 of the secondary control circuit 16. When the secondary control circuit 16 discriminates that the magnitude of the output current $I_o$ is greater than the threshold value, a high-level comparing voltage $V_k$ is generated by the comparator 163. In response to the high-level comparing voltage $V_k$, the secondary controlling and driving circuit 164 triggers the power switching circuit 154 and thus the primary control circuit 15 is enabled. At the same time, the controller 151 of the primary control circuit 15 generates a high-level second control voltage $V_{a2}$, a high-level third control voltage $V_{a3}$ and a high-level fourth control voltage $V_{a4}$. In response to the high-level third control voltage $V_{a3}$, the second primary controlling and driving circuit 153 drives the power switching circuit 154. In response to the high-level fourth control voltage $V_{a4}$, the first primary controlling and driving circuit 152 takes the place of the driving and detecting circuit 162 to drive conduction of the first switch element $Q_1$ of the selection circuit 13. In response to the high-level second control voltage $V_{a2}$, the secondary control circuit 16 is disabled and thus the primary control circuit 15 takes the place of the secondary control circuit 16 to control operations of the uninterruptible power supply 1.

At the time spot $t_4$, for reducing the overall power consumption of the uninterruptible power supply 1, the second control voltage $V_{a2}$ is switched from the high-level state to the low-level state by the controller 151. In some embodiments, the second control voltage $V_{a2}$ may be maintained at the high-level state during the primary control circuit 15 is enabled.

Figure 5:
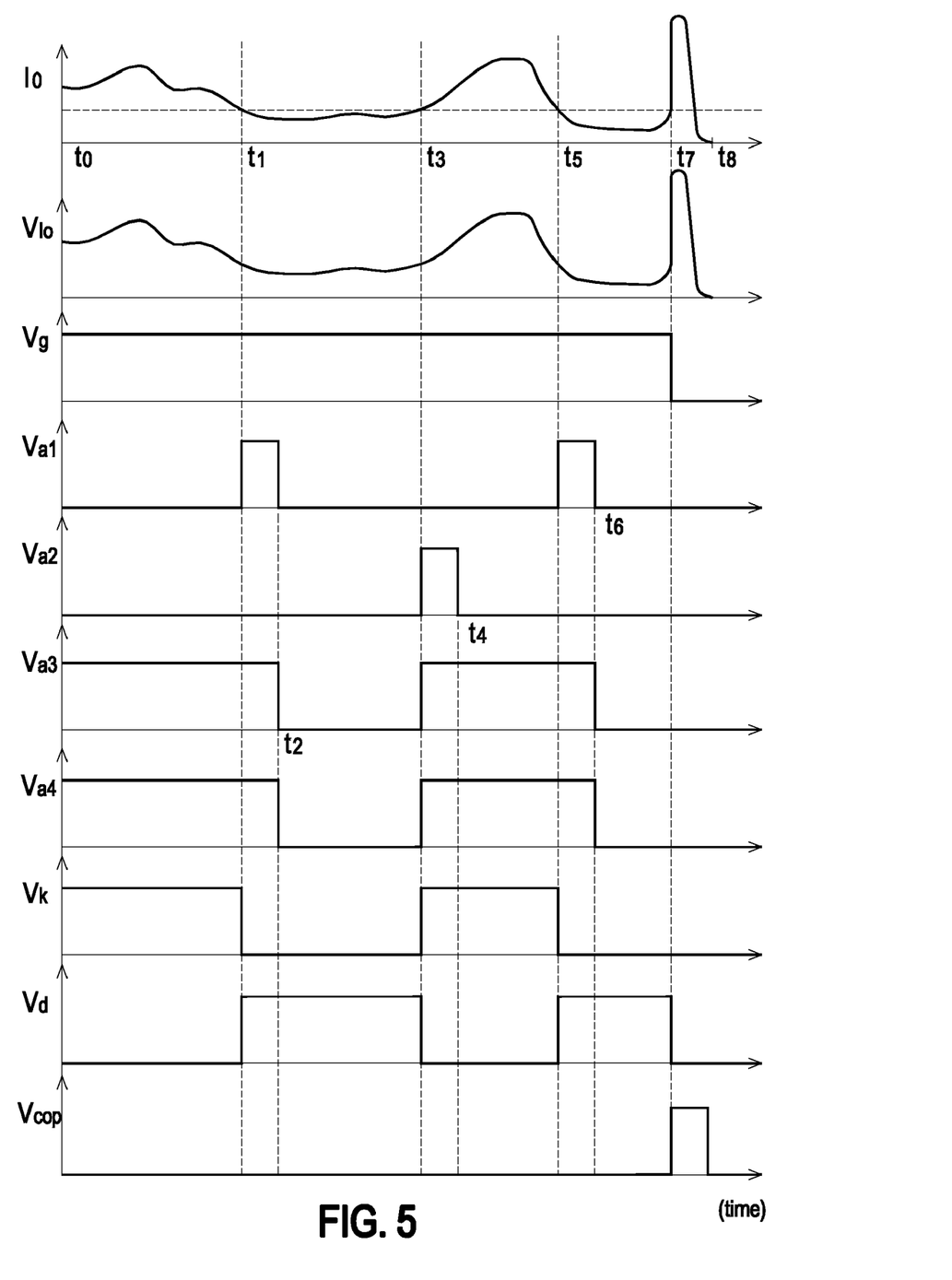
FIG. 5 is a timing waveform diagram schematically illustrating the corresponding voltage signals and current signals processed in the uninterruptible power supply of FIG. 3.

FIG. 5 is a timing waveform diagram schematically illustrating the corresponding voltage signals and current signals processed in the uninterruptible power supply of FIG. 3. Please refer to FIGS. 2, 3, 4 and 5. The waveforms of the voltage signals and current signals shown in FIG. 5 from the time spot $t_0$ to the time spot $t_4$ are similar to those shown in FIG. 4, and are not redundantly described herein.

At the time spot $t_5$, the magnitude of the output current $I_o$ is smaller than the threshold value. In response to the high-level first control voltage $V_{a1}$ generated by the primary control circuit 15, the secondary control circuit 16 is enabled and the triggering output voltage $V_d$ is switched from the low-level state to the high-level state. In response to the high-level triggering output voltage $V_d$, the first switch element $Q_1$ of the selection circuit 13 is triggered by the driving and detecting circuit 162. At this moment, a low-level comparing voltage $V_k$ is generated by the comparator 163. In response to the low-level comparing voltage $V_k$, the secondary controlling and driving circuit 164 will stop triggering the power switching circuit 154.

At the time spot $t_6$, the third control voltage $V_{a3}$ is switched from the high-level state to the low-level state. In response to the low-level third control voltage $V_{a3}$, the primary control circuit 15 is powered off and disabled. At this moment, the secondary control circuit 16 takes the place of the primary control circuit 15 to control operations of the uninterruptible power supply 1.

At the time spot $t_7$, the uninterruptible power supply 1 is suffered from overload. The operating message (e.g. the magnitude of the output current $I_o$) issued from the primary detecting circuit 14 is received by the overload detecting circuit 17. When the secondary control circuit 16 discriminates that the magnitude of the output current $I_o$ is overloaded, the overload detecting circuit 17 generates a protecting signal $V_{cop}$. In response to the protecting signal $V_{cop}$, the triggering circuit 161 generates a low-level triggering output voltage $V_d$. In response to the low-level triggering output voltage $V_d$, the driving and detecting circuit 162 stops driving the first switch element $Q_1$ of the selection circuit 13 and thus the uninterruptible power supply 1 is powered off. At the time spot $t_8$, the magnitude of the output current $I_o$ reaches zero.

Please refer to FIGS. 1C, 2C and 3C. In these embodiments, the driving and detecting circuit 162 is triggered and enabled by the triggering circuit 161. After the driving and detecting circuit 162 is enabled, the energy storage unit connecting node voltage $V_b$ is subject to voltage division by the resistors $R_{10}$ and $R_{11}$ of the driving and detecting circuit 162, and thus the triggering output voltage $V_d$ is maintained above the operating voltage (e.g. 2.5 volts). The relation between the energy storage unit connecting node voltage $V_b$ and the triggering output voltage $V_d$ is deduced as follows:

$$V_d \cong \frac{R_{10}}{R_{10} + R_{11}} \cdot V_b,$$

If the energy storage unit connecting node voltage $V_b$ is smaller than the operating voltage, the triggering output voltage $V_d$ is smaller than the reference voltage of the three-terminal voltage regulator 1621 and thus the three-terminal voltage regulator 1621 is disabled. Under this circumstance, the fifth switch element $Q_5$ is shut off, the driving and detecting circuit 162 stops driving the first switch element $Q_1$ of the selection circuit 13, and the control terminal voltage $V_g$ of the selection circuit 13 is at the low-level state. As such, the uninterruptible power supply 1 is powered off. In other words, when the electric energy of the energy storage unit 12 is transmitted to the load 9, if the charge capacity of the energy storage unit 12 detected by the driving and detecting circuit 162 is insufficient, the energy storage unit connecting node voltage $V_b$ is smaller than the operating voltage. Under this circumstance, the driving and detecting circuit 162 stops driving the first switch element $Q_1$ of the selection circuit 13 and thus the uninterruptible power supply 1 is powered off.

From the above description, the operations of the uninterruptible power supply 1 are alternately controlled by the primary control circuit 15 or the secondary control circuit 16. Since the electricity consumption of the controller 151 of the primary control circuit 15 is relatively higher, the electricity consumption of the primary control circuit 15 is higher than that of the secondary control circuit 16 even in the suspending mode. For reducing power consumption, from the time spot $t_2$ to the time spot $t_3$, the primary control circuit 15 is disabled but the secondary control circuit 16 is enabled. As a consequence, the overall efficiency of the uninterruptible power supply 1 is enhanced and the running time of the uninterruptible power supply 1 is extended. From the time spot $t_0$ to the time spot $t_1$, the primary control circuit 15 is enabled but the secondary control circuit 16 is disabled. When the primary control circuit 15 is enabled, more advanced functions will be implemented.

From the above description, the operations of the uninterruptible power supply of the present invention are alternately controlled by the primary control circuit or the secondary control circuit. According to the operating message of the uninterruptible power supply, the primary control circuit or the secondary control circuit are adaptively enabled or disabled and thus the overall efficiency of the uninterruptible power supply is enhanced. When the load is powered by the energy storage unit in the backup mode of the uninterruptible power supply, the running time of the uninterruptible power supply is extended.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An uninterruptible power supply comprising:
    an energy storage unit having an end selectively connected to an energy storage unit connecting node and the other end connected to a common terminal for storing electric energy;
    an AC-to-DC converting circuit for converting an input AC voltage into a first DC voltage;
    a charging circuit connected to said AC-to-DC converting circuit and said energy storage unit connecting node for converting said first DC voltage into an energy storage unit connecting node voltage required for charging said energy storage unit;
    a selection circuit connected to said AC-to-DC converting circuit, said energy storage unit connecting node and a load for selectively outputting said first DC voltage or said energy storage unit connecting node voltage to said load;
    a primary detecting circuit connected to an output loop of said uninterruptible power supply for detecting an operating status of said uninterruptible power supply and issuing a corresponding operating message;
    a primary control circuit connected to said primary detecting circuit and said selection circuit for controlling operations of said uninterruptible power supply; and
    a secondary control circuit connected to said primary detecting circuit, said selection circuit and said primary control circuit for controlling operations of said uninterruptible power supply, wherein said primary control circuit and said secondary control circuit are enabled or disabled according to said operating message.

2. The uninterruptible power supply according to claim 1 wherein said primary control circuit and said secondary control circuit are further connected to said energy storage unit connecting node or said AC-to-DC converting circuit, so that said primary control circuit and said secondary control circuit are powered by said energy storage unit, said charging circuit or said AC-to-DC converting circuit.

3. The uninterruptible power supply according to claim 1 wherein said primary detecting circuit is an output current detecting circuit comprising:
   a detecting resistor serially connected to the output loop of said uninterruptible power supply for detecting an output current of said uninterruptible power supply and generating a corresponding detecting resistor detecting signal; and
   a voltage-amplifying circuit connected to said detecting resistor for amplifying said detecting resistor detecting signal into an output current detecting signal, wherein said output current detecting signal includes said operating message.

4. The uninterruptible power supply according to claim 3 wherein said voltage-amplifying circuit comprises:
   a first operational amplifier;
   a first resistor having an end connected to an output terminal of said first operational amplifier and the other end connected to a negative input terminal of said operational amplifier; and
   a second resistor having an end connected to said negative input terminal of said operational amplifier and the other end connected to said common terminal.

5. The uninterruptible power supply according to claim 3 wherein said output current detecting circuit further comprises a filtering circuit, and said filtering circuit comprises a third resistor and a first capacitor, which are connected with each other in series and connected to said voltage-amplifying circuit.

6. The uninterruptible power supply according to claim 1 wherein said primary control circuit comprises:
   a power switching circuit connected to said energy storage unit connecting node;
   a first primary controlling and driving circuit connected to said selection circuit for driving said selection circuit;
   a second primary controlling and driving circuit connected to said power switching circuit and said secondary control circuit for controlling on/off statuses of said power switching circuit; and
   a controller connected to said first primary controlling and driving circuit, said second primary controlling and driving circuit, said power switching circuit, said primary detecting circuit and said secondary control circuit for controlling operations of said uninterruptible power supply, wherein said secondary control circuit is enabled, said secondary control circuit is disabled or said power switching circuit is shut off to disable said primary control circuit according to said operating message.

7. The uninterruptible power supply according to claim 6 wherein said controller is a micro controller or a digital signal processor, and said second primary controlling and driving circuit comprises:
   a second switch element having a collector connected to a control terminal of said power switching circuit; and
   a fourth resistor having an end connected to a base of said second switch element and the other end connected to said controller.

8. The uninterruptible power supply according to claim 6 wherein said power switching circuit comprises:
   a third switch element having an emitter connected to a first output terminal of said AC-to-DC converting circuit or said energy storage unit connecting node and a collector connected to a control terminal of said controller;
   a fifth resistor having an end connected to said secondary control circuit and said second primary controlling and driving circuit and the other end connected to a base of said third switch element; and
   a sixth resistor interconnected between said emitter and said base of said third switch element.

9. The uninterruptible power supply according to claim 1 wherein said secondary control circuit comprises:
   a triggering circuit connected to said primary control circuit and generating a triggering output voltage according to a first control voltage and a second control voltage issued by said primary control circuit;
   a driving and detecting circuit connected to said triggering circuit and said selection circuit for selectively triggering said selection circuit according to said triggering output voltage;
   a comparator connected to said primary detecting circuit for comparing said detecting signal indicative of said operating message with a reference voltage, thereby generating a comparing voltage; and
   a secondary controlling and driving circuit connected to said comparator and said primary control circuit for selectively enabling or disabling said primary control circuit according to said comparing voltage.

10. The uninterruptible power supply according to claim 9 wherein said triggering circuit comprises:
    a fourth switch element having a collector connected to a control terminal of said driving and detecting circuit;
    a seventh resistor having an end connected to a collector of said fourth switch element;
    a third diode serially connected with said seventh resistor and connected to said primary control circuit;
    an eighth resistor having an end connected to a base of said fourth switch element; and
    a fourth diode serially connected with said eighth resistor and connected to said primary control circuit.

11. The uninterruptible power supply according to claim 9 wherein said driving and detecting circuit comprises a fifth switch element, a fifth diode, a ninth resistor, a tenth resistor, an eleventh resistor and a three-terminal voltage regulator, wherein said fifth diode has a cathode connected to a control terminal of said selection circuit, said ninth resistor has an end connected to a base of said fifth switch element and the other end connected to a cathode of said three-terminal voltage regulator, an anode of said three-terminal voltage regulator is connected to said common terminal, a reference terminal of said three-terminal voltage regulator is connected to an output terminal of said triggering circuit, said tenth resistor has an end connected to said reference terminal of said three-terminal voltage regulator and the other end connected to said common terminal, said eleventh resistor has an end connected to said output terminal of said triggering circuit and said reference terminal of said three-terminal voltage regulator and the other end connected to an anode of said fifth diode and a collector of said fifth switch element.

12. The uninterruptible power supply according to claim 9 wherein said comparator comprises a second operational amplifier, which has a positive input terminal connected to said primary detecting circuit, a negative input terminal connected to said reference voltage and an output terminal connected to a control terminal of said secondary controlling and driving circuit, wherein said detecting signal indicative of said operating message is compared with said reference voltage, thereby generating said comparing voltage for controlling operations of said secondary controlling and driving circuit.

13. The uninterruptible power supply according to claim 9 wherein said secondary controlling and driving circuit comprises a twelfth resistor, a second capacitor and a sixth switch element, wherein said sixth switch element has an anode connected to said primary control circuit, a cathode connected to said common terminal and a control terminal connected to an output terminal of said comparator, and said primary control circuit is selectively enabled or disabled by said secondary controlling and driving circuit according to said comparing voltage.

14. The uninterruptible power supply according to claim 9 wherein said secondary control circuit further comprises an isolator circuit, which is connected to said comparator and a control terminal of said secondary controlling and driving circuit, for isolating the DC component of said comparing voltage or resetting said secondary controlling and driving circuit.

15. The uninterruptible power supply according to claim 14 wherein said isolator circuit comprises a thirteenth resistor and a third capacitor, which are serially connected between said comparator and a control terminal of the secondary controlling and driving circuit.

16. The uninterruptible power supply according to claim 1 further comprising an overload detecting circuit, and said overload detecting circuit comprises a sixth diode and a Zener diode, which are serially connected between said secondary control circuit and a detecting signal output terminal of said primary detecting circuit.

17. The uninterruptible power supply according to claim 1 wherein said selection circuit comprises a first diode, a second diode and a first switch element, said first diode has an anode connected to said AC-to-DC converting circuit and a cathode connected to a cathode of said second diode and said load, said second diode has an anode connected to said energy storage unit connecting node, said first switch element is connected to said common terminal and said load, and a control terminal of said first switch element is connected to said primary control circuit and said secondary control circuit, wherein said first switch element is conducted or shut off under control of said primary control circuit or said secondary control circuit.

18. The uninterruptible power supply according to claim 1 further comprising a seventh diode, which is interconnected between a control terminal of said selection circuit and an output terminal of said AC-to-DC converting circuit, wherein said output terminal of said AC-to-DC converting circuit is connected to a power terminal of said primary detecting circuit and a power terminal of said secondary control circuit.

19. The uninterruptible power supply according to claim 1 wherein further comprising a secondary detecting circuit, which is connected to said primary control circuit, said AC-to-DC converting circuit, said energy storage unit connecting node and an output terminal of said selection circuit for detecting an additional operating status of said uninterruptible power supply.

20. The uninterruptible power supply according to claim 19 wherein said operating status includes an output current of said uninterruptible power supply, and said additional operating status includes an input AC voltage of said uninterruptible power supply, a voltage difference across said energy storage unit or an output voltage of said uninterruptible power supply.

* * * * *